United States Patent Office 2,805,936
Patented Sept. 10, 1957

2,805,936

LEACHING OF ARSENIDE ORES

Felix A. Schaufelberger, Stamford, Conn.

No Drawing. Application August 16, 1954,
Serial No. 450,276

5 Claims. (Cl. 75—101)

The present invention is concerned with a leaching procedure in the hydrometallurgical recovery of such valuable metals as copper, nickel, cobalt, silver, gold and the like. More particularly, the invention is concerned with a process in which non-ferrous metals values such as copper, nickel and cobalt are readily dissolved as soluble salts thereof from ores and concentrates in which the metal value is chemically associated with such contaminants as antimony, arsenic, selenium and tellurium.

With the growth of commercial interest in methods for refining non-ferrous metals hydrometallurgically, particularly cobalt and nickel, increasing attention is being directed toward treatment of ores which are not amenable to treatment by present conventional methods. Particularly well illustrative of the problems involved are those ores found in various parts of the world in which a non-ferrous metal value, cobalt, copper or nickel for example, is chemically associated with arsenic. This presents both a problem in effective leaching and also a disposal problem. By conventional methods the separation of such metal values from the arsenic is exceedingly troublesome. Similar problems are also encountered in the less frequently occurring ores wherein the non-ferrous metal values are associated with stibnites, selenides and tellurides. These ores frequently also contain some sulfur as sulfides and some iron, also usually as sulfides. In may cases the sulfur and the arsenic are in some way chemically combined in the same mineral with the valuable metal.

In the past, it has been demonstrated that in the presence of sufficient "sulfide" sulfur, arsenides and sulfarsenides of non-ferrous metals can be leached under high temperature, high pressure, oxidation conditions to dissolve the metal values as sulfates. While this process has encountered some commercial success, it suffers from one rather serious defect in that the temperature and pressure requirements are quite high. This requires not only a large investment in the necessary equipment but also in high power consumption for compressing the necessary oxygen for the leaching.

Some ores also present an additional problem by having an excessively high content of "sulfide" sulfur. Therefore, complete extraction of values of non-ferrous metal results in an inordinately high production of free sulfuric acid which must be neutralized before the leach liquor can be processed to recover the dissolved non-ferrous metals. Although this production of excess sulfuric acid can be prevented by some pre-treatment, as by roasting or the like, this is an added expense if the ore contains arsenic since the resultant arsenic fume must be collected and disposed of.

It is, therefore, the principal object of the present invention to devise a process which is not subject to these difficulties. This process to be satisfactory must substantially completely extract the values in non-ferrous metals as soluble salts in less than about two hours. It should operate at much lower temperature and pressure conditions than those required in the previously known processes. It should, if possible, minimize the neutralizing problem at the end of the leaching operation.

Surprisingly, in view of the long unsatisfied demand for such a process, these objects have been simply and easily accomplished. The process may be generally stated as the use in a single operation of an active oxidizing agent, preferably supplied as nitric acid, along with the oxygen gas. The reaction is so surprisingly effective that even in open vessels iron and cobalt for example can be substantially completely extracted in as little as fifteen minutes with only 10–15% of the arsenic remaining in solution. Any additional arsenic dissolved during leaching is reprecipitated as easily-filterable $As_2O_3$. The reaction is sufficiently exothermic to provide the necessary heat.

It is particularly astonishing that the process of sulfuric acid leaching in the presence of oxygen and a small amount of nitric acid is so highly successful. Nitric acid alone cannot be used successfully, the resulting reactions being entirely too vigorous and all the arsenic which is dissolved is raised to the five-valent condition, resulting in the illustrative case in the precipitation of cobalt and/or ferric arsenate.

The fact that arsenic is precipitated as a crystalline arsenic oxide is an additional and a very definite advantage in the process of the present invention. Arsenic oxide is produced in a readily collectable form. Because of this feature, no large or excessive qualities of free sulfuric acid are produced in the present process and the neutralization problem is thereby eliminated.

A wide range of sulfuric acid-nitric acid ratios and concentrations have been observed. Quite surprisingly, effective results are only obtained when the nitric acid concentration in the leach liquor is from about 1–5% and there is a markedly definite preferable range of from about two to about three percent.

While possible to do so, carrying out the reaction in open vessels is subject to two practical objections. One is that nitrous gases are evolved with a resultant venting or recovery problem. The second is the necessity for continually adding makeup nitric acid to drive the reaction. This problem is completely eliminated by carrying out the reaction in a closed vessel. This permits readily supplying oxygen in sufficient quantities to keep the evolved gases regenerating the nitric acid and driving the reaction. Even in a closed vessel there is less of a problem of supplying heat to start the reaction going or of removing heat in case the reaction becomes too ebullient than with the above-noted high temperature, high pressure process. In a closed vessel, reaction is readily started and comes to a more or less stable temperature of from about 125°–150° C., usually about 130°–135° C.

Reaction is readily initiated by heating the charge to about 125°–135° C. At this point there is a rapid pressure buildup indicating an increase in the amount of nitrous oxides in the gas phase. A fairly sharp temperature rise occurs at the same time. However the average temperature usually reached is easily maintained below the temperature and pressures which are ordinarily encountered in the high temperature, high pressure process of the prior art.

For economic reasons it is desirable to recover nitrate from the end liquor. This is done to decrease the expense for makeup nitric acid. It also is of assistance in the subsequent recovery of the non-ferrous metal. For example, nickel or cobalt is usually precipitated as elemental metal from an ammoniacal sulfate solution with hydrogen.

It is an advantage of the present invention that sulfate equivalent to the metal values may be supplied as such or be formed in situ by the oxidation of sulfides during the reaction. Nitric acid may also be supplied in any desired manner as by adding aqueous nitric acid solution or by furnishing nitrous oxide gases which will oxidize to nitric acid during the reaction.

Pregnant leach liquor, as withdrawn from the operation, may have a dissolved arsenic content. Under the ordinary conditions as much as 20 grams per liter of arsenic (usually as $As_2O_3$) may be held in solution. This is easily eliminated, however, by treating the liquor with sufficient lime, limestone or equivalent neutralizing agent to produce a pH of about five. This small amount of liming for neutralizing is a very definite advantage over the large quantities which are required to remove the excess amounts of sulfuric acid formed in the high temperature, high pressure process wherein sufficient iron sulfide is treated to obtain substantial equivalents of iron to the arsenic or other metalloid which is to be eliminated.

The practice of the present invention may be readily illustrated by the following examples which are intended for that purpose and not by way of limitation. Except as otherwise noted, all parts are by weight.

Example 1

A 100 gram sample of copper concentrate containing enargyte ($3Cu_2S \cdot 1As_2S_5$), and assaying Cu—46, Fe—3%, As—13% and S—28% is slurried in 1000 cc. solution containing 155 gms. of recycled $H_2SO_4$ and 33 gms. of $HNO_3$ and maintained for about one hour at 105°–180° C., under a total pressure of about 150 p. s. i. g., maintained with oxygen gas. At the end of this period copper and some iron are found leached as copper and iron sulfates. About 11 gms./liter of As is found in solution in the form of dissolved $As_2O_3$.

Example 2

About a 300 gm. sample of French Moroccan cobalt-arsenide ore, assaying (weight percent) Co—10, Ni—1, Cu—1.6, Fe—3.5, As—41.5 and S—1.2, is slurried in a solution containing 1000 ml. water, 129 gm. $H_2SO_4$ and 30 gm. $HNO_3$ and heated in a stirred autoclave to 125° C. Oxygen is added to bring the total pressure to 150 p. s. i. g., and treatment continued for about two hours. The autoclave is cooled and opened, the charge being withdrawn and filtered. A residue containing white and canary yellow solids is obtained which contains (weight percent) Co—0.15, Fe—2.9, and As—32.5. The filtrate contained (g./l.): Co—26.4, Fe—2.2 and As—23.2. Cobalt extraction is about 99.1%.

As was noted above, the nitric acid may be supplied as aqueous nitric acid solution or by furnishing nitrous oxide of gases such as nitric oxide (NO). The practice of the invention according to the latter procedure is shown in the following example.

Example 3

An autoclave charge is prepared another sample of the same ore according to the procedure in Example 2, but omitting the $HNO_3$. Nitric oxide gas is furnished in amount equivalent to 50 gms. $HNO_3$. The operational procedure of Example 2 is repeated, resulting in about 96% cobalt extraction in a solution containing (g./l.): Co—26.4, Fe—2.2 and As—23.2. The unwashed residue contains 32.5% As, principally as $As_2O_3$.

It was noted above, also, that all or part of the sulfuric acid requirements can be met by oxidizing "sulfide" sulfur to sulfate during the leaching treatment. However it is generally recycled in part from a previous leaching cycle. This practice is illustrated by the following example.

Example 4

An autoclave charge is prepared from a sample of another ore assaying (weight percent) Co—9.9, Ni—1, Cu—1.6, Fe—5.6 and As 44. A 365 gm. sample is slurried in a mixed liquor comprising about 780 ml. of water containing 50 gms. of $H_2SO_4$ and about 420 ml. of recycle liquor containing (g./l.) Fe—90, $H_2SO_4$—120 and $HNO_3$—15. Nitric oxide gas equivalent to 27 g./l. is furnished, and the charge is treated with agitation for about two hours at 130° C., under a total pressure of 150 p. s. i. g. maintained with oxygen gas. The autoclave is cooled, and the charge filtered. Cobalt extraction is about 97% in a filtrate containing (g./l.) Co—28.8, Fe—3 and As—20.7. The residue before washing contains 0.4% sulfur and about 21% As mostly as $As_2O_3$.

In the practice of the present invention not only is the use of a generally lower temperature advantageous, but the use of lower temperature is operationally important. Temperatures of from 100° to 150° C. may be used. However, as was noted above, the more usual range is about 125°–135° C. This is particularly important when the feed has a high arsenic content. If an excessive temperature is used, extraction of metal is not impaired, but the filterability of resultant slurry is poor. For this reason temperatures of above about 130° C. are undesirable when the feed is high in arsenic.

It is also an important advantage of the present invention that extraction can be rapidly accomplished. This is shown in the following example.

Example 5

A cobalt-arsenide ore, assaying Co—11%, Ni—1.0%, Cu—1.6%, Fe—3.2%, As—43.5%, and S—1.2%, is slurried with water and sufficient sulfuric acid to provide 50 g./l. Sufficient nitric oxide to provide 40 g./l. of nitric acid is furnished. In a stirred autoclave, the slurry is heated to about 130° C. under an oxygen over-pressure of from 100–150 pounds per square inch for about 30 minutes. On opening the autoclave a white precipitate of $As_2O_3$ was observable. During the cooling more $As_2O_3$ crystallized. Examination of the solid residue indicated that substantially all the cobalt and iron had been extracted but only about 12.5% of the arsenic.

In fact it is desirable to carry out the extraction fairly rapidly. The operating conditions of temperature, nitric acid content, oxygen pressure and the like should be so chosen as to accomplish the desired result in about two hours or less, extraction will not be impaired but the overall result will be less satisfactory. Arsenic may be oxidized to the higher valent form although at a rate slower than the other reactions involved here. The higher valent oxide ($As_2O_5$) is much more soluble than the desired $As_2O_3$. This is shown in the following example.

Example 6

An autoclave charge of 365 gms. of the ore of Example 4 is slurried in a liter of solution containing 118 gms. $H_2SO_4$ and 27 gms. $HNO_3$. Slurry is treated for eight hours at 130° C., under 75 p. s. i. g. pressure of oxygen, cooled and filtered. Excellent Co extraction of 99.6% is obtained in a filtrate containing (g./l.) Co—50.5, Fe—0.14 and As—60.7.

While this procedure did give excellent extraction of cobalt it will be seen that an excessive content of dissolved arsenic was obtained as compared with the 20.7 g./l. of Example 4.

A further graphic illustration of the advantages of the present invention is shown in the following table in which the left-hand column illustrates the conditions preferred in the present process and the right-hand column indicates the conditions necessary in the previously known high pressure, high temperature process.

TABLE 1

[Conditions required in producing 5 tons/day of Co from feed assaying about 10–11% Co, 1.0–1.5% Ni, 45–46% As, 2–10% Fe]

|  | Present Process | High Temp. Process |
|---|---|---|
| Temp. (° C.) | 100–150 | above 230 |
| Press. (p. s. i. g.) | 10–200 | 500–1,000 |
| Time per cycle, hours | 0.5–2 | 1.5–3.0 |
| Pyrite required, tons | 15–16 | 37–40 |
| Lime required, tons | 4.5–5.5 | 29–31 |
| Oxygen required, tons | 7.5–8.5 | 62–66 |
| $HNO_3$ required, tons | 0.1 |  |

A method of eliminating residual nitric acid from the pregnant leach liquor is to use the liquor to treat an amount of new ore or ore concentrate, allowing the nitrous oxide gases to be evolved as the nitrates are used up. These gases can be then collected and reused after suitable regeneration.

What is claimed is:

1. An acidic oxidation process for leaching a metal value selected from the group consisting of copper, nickel, cobalt, silver and mixtures thereof as a dissolved sulfate from ore containing said metal value in association with at least one contaminant metalloid selected from the group consisting of arsenic, antimony, selenium and tellurium and mixtures thereof comprising the steps of: forming a slurry of the ore in an aqueous sulfuric acid liquor, said slurry having a total sulfur content at least stoichiometrically equivalent to said metal value as its sulfate; supplying in said slurry sufficient nitric acid to produce a concentration in the liquid of from about one to about five percent; in the presence of oxygen gas, heating resultant slurry to and maintaining it at from about 100° to about 150° C.; maintaining the nitric acid concentration at from about one to about five percent, whereby conversion of said metal value to dissolved metal sulfate and of said metalloid to an oxide thereof in its lower valent form is initiated; continuing treatment by said heating and nitric acid concentration maintenance until said metal value is substantially dissolved, and stopping said treatment whereby oxidation of said metalloid to its higher valent form is minimized.

2. A process according to claim 1 in which leaching is carried out in a closed vessel under an oxygen overpressure of from about 10 to about 200 pounds per square inch gauge.

3. A process according to claim 1 in which nitric acid concentration is maintained at from about two to about three percent throughout the treatment.

4. A process according to claim 1 in which after said treatment resultant solution is treated with a small amount of additional mineral in sufficient quantity to eliminate residual nitric acid.

5. A process according to claim 1 in which said slurry is maintained at a temperature of from about 125°–135° C., and said treatment is continued for not more than about two hours.

References Cited in the file of this patent

UNITED STATES PATENTS

| | | |
|---|---|---|
| 981,451 | McKechnie | Jan. 10, 1911 |
| 1,150,787 | Bankin | Aug. 17, 1915 |
| 2,686,114 | McGauley et al. | Aug. 10, 1954 |

UNITED STATES PATENT OFFICE
CERTIFICATE OF CORRECTION

Patent No. 2,805,936 September 10, 1957

Felix A. Schaufelberger

It is hereby certified that error appears in the printed specification of the above numbered patent requiring correction and that the said Letters Patent should read as corrected below.

Column 2, line 28, for "qualities" read --quantities--.

Signed and sealed this 21st day of January 1958.

(SEAL)
Attest:
KARL H. AXLINE
Attesting Officer

ROBERT C. WATSON
Commissioner of Patents